(12) United States Patent
Angsburg et al.

(10) Patent No.: US 7,093,058 B2
(45) Date of Patent: *Aug. 15, 2006

(54) SINGLE REQUEST DATA TRANSFER REGARDLESS OF SIZE AND ALIGNMENT

(75) Inventors: Victor R. Angsburg, Cary, NC (US); James N. Dieffenderfer, Apex, NC (US); Bernard C. Drerup, Austin, TX (US); Richard G. Hofmann, Apex, NC (US); Thomas A. Sartorius, Raleigh, NC (US); Barry J. Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/246,427

(22) Filed: Oct. 7, 2005

(65) Prior Publication Data

US 2006/0031705 A1 Feb. 9, 2006

Related U.S. Application Data

(63) Continuation of application No. 10/249,302, filed on Mar. 28, 2003.

(51) Int. Cl.
  *G06F 13/40* (2006.01)
  *H04L 12/56* (2006.01)
(52) U.S. Cl. .................... 710/317; 370/389
(58) Field of Classification Search ............... 710/307; 370/389
  See application file for complete search history.

(56) References Cited

U.S. PATENT DOCUMENTS 4,706,190 A * 11/1987 Bomba et al. ............. 710/108

(Continued)

FOREIGN PATENT DOCUMENTS

| EP | 0489944 | 12/1990 |
| EP | 0627688 A1 | 5/1994 |
| EP | 0627688 B1 | 5/1994 |

OTHER PUBLICATIONS

IBM Technical Disclosure Bulletin, vol. 32, No. 8B, Jan. 1990, AT887-0871, TET, R. Arimilli, S. Dhawan and D.W. Siegel, Dynamic Bus Transfer Algorithm.

(Continued)

*Primary Examiner*—Rehana Perveen
*Assistant Examiner*—Jeremy S. Cerullo
(74) *Attorney, Agent, or Firm*—James J. Cioffi; Hoffman, Warnick & D'Alessandro LLC

(57) ABSTRACT

A method, computer system and set of signals are disclosed allowing for communication of a data transfer, via a bus, between a master and a slave using a single transfer request regardless of transfer size and alignment. The invention provides three transfer qualifier signals including: a first signal including a starting byte address of the data transfer; a second signal including a size of the data transfer in data beats; and a third signal including a byte enable for each byte required during a last data beat of the data transfer. The invention is usable with single or multiple beat, aligned or unaligned data transfers. Usage of the three transfer qualifier signals provides the slave with how many data beats it will transfer at the start of the transfer, and the alignment of both the starting and ending data beats. As a result, the slave need not calculate the number of bytes it will transfer. In terms of multiple beat transfers, the number of data transfer requests are reduced, which reduces the amount of switching, bus arbitration and power consumption required. In addition, the invention allows byte enable signals to be used for subsequent data transfer requests prior to the completion of the initial data transfer, which reduces power consumption and allows for pipelining of data transfer requests.

4 Claims, 3 Drawing Sheets

U.S. PATENT DOCUMENTS

| | | |
|---|---|---|
| 4,750,154 A | 6/1988 | Lefsky et al. |
| 4,839,801 A | 6/1989 | Nicely et al. |
| 5,101,479 A | 3/1992 | Baker et al. |
| 5,170,477 A | 12/1992 | Potter et al. |
| 5,237,322 A | 8/1993 | Heberle |
| 5,495,240 A | 2/1996 | Heberle |
| 5,550,189 A | 8/1996 | Qin et al. |
| 5,550,972 A | 8/1996 | Patrick et al. |
| 5,566,312 A | 10/1996 | Pedneau |
| 5,590,358 A | 12/1996 | Mizrahi-Shalom et al. |
| 5,594,927 A | 1/1997 | Lee et al. |
| 5,696,946 A | 12/1997 | Patrick |
| 5,742,755 A | 4/1998 | Hervin |
| 5,854,640 A | 12/1998 | North et al. |
| 5,875,147 A | 2/1999 | Park |
| 6,026,239 A | 2/2000 | Patrick et al. |
| 6,076,136 A | 6/2000 | Burroughs et al. |
| 6,105,119 A | 8/2000 | Kerr et al. |
| 6,115,805 A | 9/2000 | Rhodes et al. |
| 6,122,335 A | 9/2000 | Colella et al. |
| 6,125,435 A | 9/2000 | Estakhri et al. |
| 6,157,971 A | 12/2000 | Gates |
| 6,230,238 B1 | 5/2001 | Langan et al. |
| 6,240,479 B1 | 5/2001 | Snyder et al. |
| 6,269,137 B1 | 7/2001 | Colella et al. |
| 6,453,388 B1 | 9/2002 | Gonzales et al. |
| 6,581,116 B1 * | 6/2003 | Arimilli et al. ............. 710/110 |
| 2001/0010063 A1 * | 7/2001 | Hirose et al. ............... 710/240 |
| 2003/0128699 A1 * | 7/2003 | Reams ....................... 370/389 |

OTHER PUBLICATIONS

IBM Technical Disclosure Bulletin, vol. 38, No. 07, Jul. 1995, AT893-0549, MEM, L.B. Arimilli and P.J. Satz, Reduced Logic Data Alignment for Programmed Input/Output Store Transfer from the System Input/Output Bus to an Input/Output Bus.

IBM Technical Disclosure Bulletin, vol. 38, No. 07, Jul. 1995, AT893-0550, MEM, L.B. Arimilli and P.J. Satz, Reduced Data Alignment Logic for Programmed Input/Output Load Transfer from an I/O Bus to the System Input/Output Bus.

* cited by examiner

SINGLE REQUEST DATA TRANSFER REGARDLESS OF SIZE AND ALIGNMENT

This application is a continuation of application Ser. No. 10/249,302, filed Mar. 28, 2003, currently pending.

BACKGROUND OF THE INVENTION

1. Technical Field

The present invention relates generally to data transfers, and more particularly, to a method, system and set of signals for completing a data transfer using a single transfer request.

2. Related Art

In computer systems, the main components communicate with each other through an information pathway called a bus. A bus is a standardized interface allowing communication between initiators, called masters, and destination components, called slaves. The nature of the data transferred between a master and a slave may vary both in the amount, and its address alignment. Data transfer sizes may vary from one byte of data up to hundreds, or even thousands, of bytes.

"Address alignment" refers to the starting and ending memory address locations of the data transfer. A data transfer is "aligned" if all of its data beats utilize all of the byte lanes of the bus. A "data beat" is defined as a transfer of data across the bus, full width or less, in one time interval or clock cycle. Alignment and use of all byte lanes during data transfers produces maximum bus throughput and overall system performance. In order to achieve alignment, the starting address and the total size of a transfer must be a multiple of the bus size. For example, with a 4-byte bus, aligned transfers must have a starting address that is a multiple of 4 (i.e., 0, 4, 8, etc.), and their total size must be a multiple of 4. A data transfer is "unaligned" if one or more of its data beats does not use all of the byte lanes of the bus. In order for this to occur, either the starting address or the total size of the transfer (or both) must not be a multiple of the bus size. For example, with a 4-byte bus, if the starting address is 2 (not a multiple of 4), then the first data beat of the transfer will only use two of the bytes of the bus. Another example, again with a 4-byte bus, is a transfer of 6 bytes (again, not a multiple of 4). In this case, even if the starting address is a multiple of 4 (e.g., address 0), then the first data beat will be aligned (i.e., using all four bytes of the bus), but the second data beat will be unaligned because it will only use two of the bytes of the bus. Note that a transfer for which the starting address is not a multiple of the bus size may result in both the first and the final data beats being unaligned. For example, with a 4-byte bus, a transfer of 8 bytes with a starting address of 2 will result in: a first data beat of an unaligned transfer of 2 bytes (addresses 2 and 3), a second data beat of an aligned transfer of 4 bytes (addresses 4–7), and a final data beat of an unaligned transfer of 2 bytes (addresses 8 and 9).

In most computer and communication systems, data transfers may begin unaligned, end unaligned or both. However, the emerging use of various information data packet protocols that allow packet sizes of an arbitrary number of bytes presents an increasing number of unaligned transfers, which reduce bus throughput and overall system performance. Unaligned data transfers present additional problems when the transfer requires multiple data beats (i.e., cycles) of the bus. In particular, a master must make potentially three different transfer requests for each data packet when the data transfer starts and ends unaligned. For example, a data transfer of 86 bytes that starts and ends unaligned and is made across a 128-bit data bus may require three separate transfers. For example, a first partial data bus transfer request as a single request of 11 bytes, an aligned burst transfer request of 64 bytes, and finally another partial data bus transfer request of 11 bytes. In this case, the master has to have the associated extra logic to perform address alignment up to and following the burst transfer. Another issue with this technique are delays caused by bus arbitration. In particular, a master has to arbitrate amongst other masters requesting data transfers. As a result, delays between portions of a multiple beat unaligned data transfer may occur due to other masters winning arbitration and performing their transfer request(s). This can delay the overall data packet delivery significantly and interrupt an isochronous data transfer protocol.

One technique for addressing multiple beat, unaligned data transfers has been to perform an open ended burst transfer and treat each data beat as a separate transfer. In this case, each data beat is supplied with all the information required for a transfer including, in particular, byte enables. This technique, however, does not allow byte enable signals to be used for subsequent transfer requests after the initial request is made, which requires each data beat to include byte enable signaling. Accordingly, this technique may generate significant signaling requirements for a multiple beat transfer, which increases circuitry and bus switching demands for each data beat, which increases power consumption. This technique also does not provide the slave with the entire payload size at the start of the transfer, which is useful for the prefetching of read data and time allocation of write buffers.

The above technique also presents a problem relative to "pipelining" of data transfers. Pipelining of data transfers involves broadcasting pending master data transfer requests to slaves during the busy state of the data bus(ses). Pipelining allows slaves to allocate resources or prefetch data prior to their respective data tenure on the requesting bus, which reduces latency and increases bus throughput. In order to address pipeline transfer requests, two sets of byte enable signals would be required with the above technique, i.e., one for data tenure and one for pipelined address tenure. Dividing large unaligned data transfers into multiple transfer requests diminishes the advantages of pipelining because the slaves must handle an increased number of requests, and do not know at the transfer start whether multiple such requests by the same master constitute a single transfer of an unaligned portion of data.

In view of the foregoing, a need remains for efficient and simple data transfers that do not suffer from the problems of the related art. Specifically, a need remains for a technique for efficiently communicating both the starting and ending data alignments for multiple beat data transfers as part of the initial transfer request.

SUMMARY OF THE INVENTION

A method, computer system and set of signals are disclosed allowing for communication of a data transfer, via a bus, between a master and a slave using a single transfer request regardless of transfer size and alignment. The invention provides three transfer qualifier signals including: a first signal including a starting byte address of the data transfer; a second signal including a size of the data transfer in data beats; and a third signal including a byte enable for each byte required during a last data beat of the data transfer. The invention is usable with single or multiple beat, aligned or unaligned data transfers. Usage of the three transfer qualifier signals provides the slave with how many data beats it will transfer at the start of the transfer, and the alignment of both the starting and ending data beats. As a result, the slave need not calculate the number of bytes it will transfer. In terms of multiple beat transfers, the number of data transfer requests are reduced, which reduces the amount of switching, bus arbitration and power consumption required. In addition, the invention allows byte enable signals to be used for subsequent data transfer requests prior to the completion of the initial data transfer, which reduces power consumption and allows for pipelining of data transfer requests.

A first aspect of the invention is directed to a set of signals for handling a data transfer across a bus, the set of signals comprising: a first signal including a starting byte address of the data transfer; a second signal including a size of the data transfer in data beats; and a third signal including a byte enable for each byte required for a last data beat of the data transfer.

A second aspect of the invention provides a method of completing a first data transfer across a bus using a single data transfer request, the method comprising: transmitting, from a first master to the bus, a plurality of signals including: a first data transfer request signal for the first data transfer, an address bus signal including a starting byte address of the first data transfer, a transfer size signal including a size of the first data transfer in data beats, and a byte enable signal including a byte enable for each byte required during a last data beat of the first data transfer; and completing the first data transfer.

A third aspect of the invention includes a computer system comprising: a master functional unit to initiate a data transfer request; a bus including a plurality of bytes; and a data transfer unit coupled to the master functional unit, the data transfer unit configured to generate: a data transfer request signal; a first signal including a starting byte address of the data transfer; a second signal including a size of the data transfer in data beats; and a third signal including a byte enable for each byte required during a last data beat of the data transfer.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

The invention disclosed herein is a method, computer system and set of signals, for completing a data transfer between master and slave across a bus using a single data transfer request regardless of whether the data transfer is aligned or unaligned, or requires a single data beat, i.e., cycle, or multiple data beats. The data transfer may be unaligned at a starting address and/or an ending address. However, each data transfer must be for contiguous data. That is, all bytes between the starting address and the ending address must be transferred.

For purpose of clarity only, the description includes the following headings: I. Computer System Overview, II. Method, III. Transfer Qualifier Signals, IV. Illustrative Operation, V. Conclusion.

I. Computer System Overview

Figure 1:
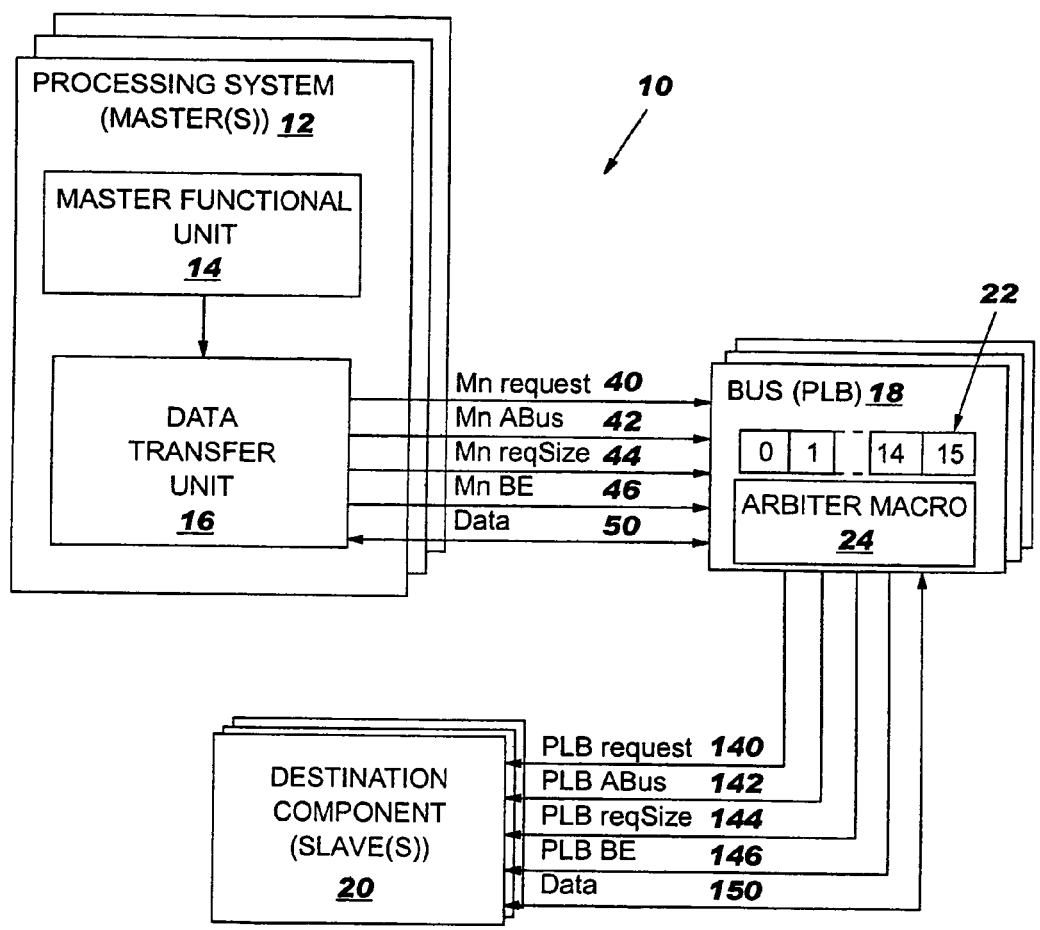
FIG. 1 shows a block diagram a computer system of the invention.

With reference to the accompanying drawings, FIG. 1 is a block diagram of a computer system 10 of the invention. Computer system 10 includes a processing system 12 (hereinafter "master" 12), a processor local bus(PLB) 18 (hereinafter "bus"), and a destination component 20 (hereinafter "slave"). Master 12 includes a master functional unit 14 and a data transfer unit 16. It should be recognized that while only one master 12, bus 18 and slave 20 are illustrated, the teachings of the invention are applicable to a computer system 10 having any number of masters 12, busses 18 and slaves 20. As known to those in the art, bus 18 communicates data between master 12 and slave 20 via data busses 50, 150. Various bus topologies are possible. For example, data busses 50, 150 may be a shared bus or two unidirectional busses. It should be recognized that other topologies are also known and applicable relative to the invention. Bus 18 includes an arbiter 24 for arbitrating usage of the bus between a number of masters 12 and a number of slaves 20. In one embodiment, arbiter macro 24 directs data transfers between selected master(s) 12 and slave(s) 20, and implements address pipelining. Slave 20 can be any now known or later developed destination component, such as system memory, and may include any intermediate components necessary for communication therewith, such as a memory controller (not shown). Master functional unit 14 may include, for example, a central processing unit (CPU) or any other components now known or later developed for initiating transfers with a slave 20. Master functional unit 14 communicates with data transfer unit 16, which forms data transfer request signals (Mn request) 40 and handles communications relative thereto. The "n" in "Mn" is an integer used to denote one of many masters.

Figure 2:
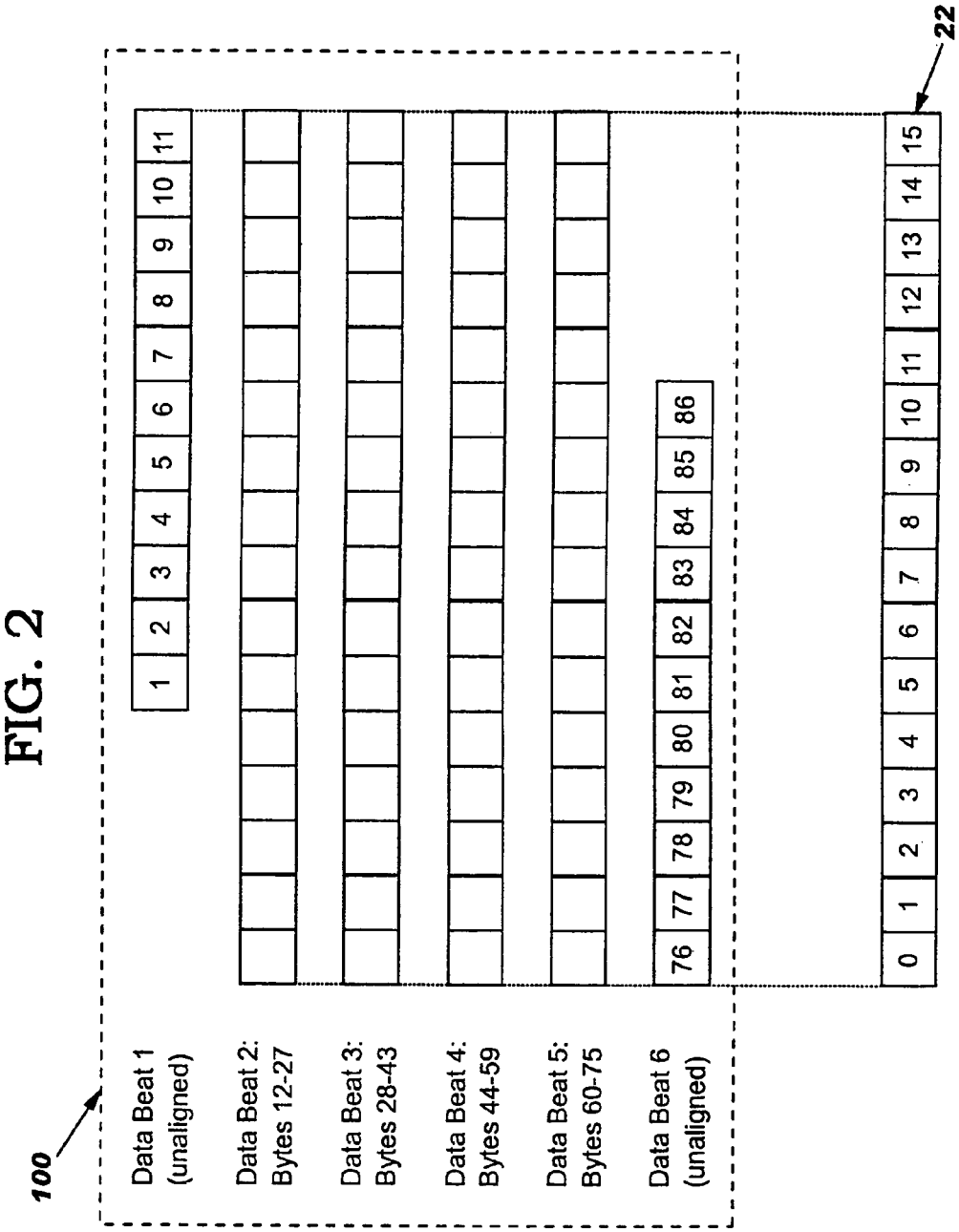
FIG. 2 shows a data transfer-bus alignment diagram for an unaligned, multiple beat data transfer.

The invention will be described herein with reference to a 128-bit data bus. It should be recognized, however, that the teachings of the invention are applicable to any width data bus. Referring to FIGS. 1 and 2, bus 18 includes sixteen byte-lanes 22 that are denoted 0:15 (each hereinafter referred to as a "byte"). Each byte 22 is capable of handling 8-bits of data. For purposes of clarity, the description that follows uses "Big Endian" bit ordering, i.e., bit 63 is a least significant bit and bit 0 is a most significant bit.

II. Method

Returning to FIG. 1, the method of completing a data transfer across a bus using a single data transfer request includes transmitting, from a first master 12 to a bus 18, a plurality of signals including: a data transfer request signal 40 for the data transfer, an address bus signal 42, a transfer size signal 44, and a byte enable signal 46; and completing the data transfer. As used herein, the term "signal" may include one or more bits of information. The step of completing includes transmitting the plurality of signals 140, 142, 144, 146 from bus 18 to slave 20, and communicating data 50, 150 between the slave and master 12 via bus 18, i.e., either read or write. The initial signals 40, 42, 44, 46 are generated by data transfer unit 16 as directed by master functional unit 14, and signals 140, 142, 144, 146 are functional equivalents of those initial signals. Arbiter macro 24 of bus 18 directs or communicates the signals 140, 142, 144, 146 to slave 20.

The invention also provides for pipelining of data transfer requests. In this regard, the method may further include the steps of transmitting at least one second, data transfer request from the one of the original master or another, second master to bus 18 for a second data transfer prior to completing the preceding data transfer. Any number of second data transfer requests can be handled in this fashion. The master generating each second data transfer request may or may not change from transfer to transfer. That is, the master that generates the second data transfer request may be the same as, or different than, the master that generated the preceding data transfer request. Each second data transfer request also includes transmitting an address bus signal 42, 142, transfer size signal 44, 144 and byte enable signal 46, 146 for the respective second data transfer.

III. Transfer Qualifier Signals

The details of the three transfer qualifier signals will now be described. Address bus signal (denoted Mn ABus 42 or PLB ABus 142 in FIG. 1) includes a starting byte address of the data transfer. The address bus signal may include any number of address bits corresponding to the size of addressable memory. For purposes of discussion, however, only the lower 4-bits are relevant. All contiguous bytes from the starting byte address up to the width of the bus must be transferred. The address bus signal along with the other transfer qualifier signals alleviates the need for intra-byte specific information pertaining to where a data transfer begins. Bus 18 asserts the address bus signal (PLB ABus) 142 as a valid address to slave 20 as the bus transfer request signal (PLB request) 140 is asserted.

Request transfer size signal (denoted Mn reqSize 44 or PLB reqSize 144 in FIG. 1) includes a size of the data transfer that is stated in terms of data beats required to fulfill the requested data transfer. Since one, or at most two, data beats may be for a partial bus width transfer, the number of beats multiplied by the bus width, in bytes, does not necessarily yield the total number of bytes being requested. Address bus signal 42, 142 and byte enable signal 46, 146 (described below) define whether a full bus width or a partial bus width transfer is being requested.

Byte enable signal (denoted Mn BE 46 or PLB BE 146 in FIG. 1) includes a byte enable for each byte 22 required for the last data beat of the data transfer. Each bit corresponds to a byte of the read or write data busses 50, 150. For single data beat transfers, byte enable signal 46, 146 identifies which bytes of data bus 50, 150 are to be read or written to. In this case, the "last data beat" is also the first data beat. For multiple data beat transfers, byte enable signal 46, 146 indicates the byte enable combination for the last data beat of the data transfer. In both cases, the starting byte location for the first data beat is indicated by the address bus signal.

All byte enables from the initial address, indicated by address bus signal 42, 142, up to the asserted bits of the byte enables for the last data beat of the transfer, indicated in byte enable signal 46, 146, are included in the transfer. Accordingly, only contiguous byte enables are allowed. The following table shows possible byte enable signals for a 128-bit bus, the corresponding byte(s) enabled (0–15), starting byte address, and whether the byte enable signal can be asserted for a single data beat data transfer and/or for a multiple beat data transfer. Relative to multiple data beats, the byte enable signal must provide for contiguous byte enables.

| Byte Enable Signal | Bytes Used | Address Signal (4 Least Sig. Bits) | Beat Transfer Types for which Signal can be Asserted |
|---|---|---|---|
| 1000_0000_0000_0000 | Byte 0 | 0000, any | Single, Multiple |
| 0100_0000_0000_0000 | Byte 1 | 0001 | Single |
| 0010_0000_0000_0000 | Byte 2 | 0010 | Single |
| 0001_0000_0000_0000 | Byte 3 | 0011 | Single |
| 0000_1000_0000_0000 | Byte 4 | 0100 | Single |
| 0000_0100_0000_0000 | Byte 5 | 0101 | Single |
| 0000_0010_0000_0000 | Byte 6 | 0110 | Single |
| 0000_0001_0000_0000 | Byte 7 | 0111 | Single |
| 0000_0000_1000_0000 | Byte 8 | 1000 | Single |
| 0000_0000_0100_0000 | Byte 9 | 1001 | Single |
| 0000_0000_0010_0000 | Byte 10 | 1010 | Single |
| 0000_0000_0001_0000 | Byte 11 | 1011 | Single |
| 0000_0000_0000_1000 | Byte 12 | 1100 | Single |
| 0000_0000_0000_0100 | Byte 13 | 1101 | Single |
| 0000_0000_0000_0010 | Byte 14 | 1110 | Single |
| 0000_0000_0000_0001 | Byte 15 | 1111 | Single |
| 1100_0000_0000_0000 | Bytes 0, 1 | 0000, any | Single, Multiple |
| 0110_0000_0000_0000 | Bytes 1, 2 | 0001 | Single |
| 0011_0000_0000_0000 | Bytes 2, 3 | 0010 | Single |
| 0001_1000_0000_0000 | Bytes 3, 4 | 0011 | Single |
| 0000_1100_0000_0000 | Bytes 4, 5 | 0100 | Single |
| 0000_0110_0000_0000 | Bytes 5, 6 | 0101 | Single |
| 0000_0011_0000_0000 | Bytes 6, 7 | 0110 | Single |
| 0000_0001_1000_0000 | Bytes 7, 8 | 0111 | Single |
| 0000_0000_1100_0000 | Bytes 8, 9 | 1000 | Single |
| 0000_0000_0110_0000 | Bytes 9, 10 | 1001 | Single |
| 0000_0000_0011_0000 | Bytes 10, 11 | 1010 | Single |
| 0000_0000_0001_1000 | Bytes 11, 12 | 1011 | Single |
| 0000_0000_0000_1100 | Bytes 12, 3 | 1100 | Single |
| 0000_0000_0000_0110 | Bytes 13, 14 | 1101 | Single |
| 0000_0000_0000_0011 | Bytes 14, 15 | 1110 | Single |
| 1110_0000_0000_0000 | Bytes 0–2 | 0000, any | Single, Multiple |
| 0111_0000_0000_0000 | Bytes 1–3 | 0001 | Single |
| 0011_1000_0000_0000 | Bytes 2–4 | 0010 | Single |
| 0001_1100_0000_0000 | Bytes 3–5 | 0011 | Single |
| 0000_1110_0000_0000 | Bytes 4–6 | 0100 | Single |
| 0000_0111_0000_0000 | Bytes 5–7 | 0101 | Single |
| 0000_0011_1000_0000 | Bytes 6–8 | 0110 | Single |
| 0000_0001_1100_0000 | Bytes 7–9 | 0111 | Single |
| 0000_0000_1110_0000 | Bytes 8–10 | 1000 | Single |
| 0000_0000_0111_0000 | Bytes 9–11 | 1001 | Single |
| 0000_0000_0011_1000 | Bytes 10–12 | 1010 | Single |
| 0000_0000_0001_1100 | Bytes 11–13 | 1011 | Single |
| 0000_0000_0000_1110 | Bytes 12–14 | 1100 | Single |
| 0000_0000_0000_0111 | Bytes 13–15 | 1101 | Single |
| 1111_0000_0000_0000 | Bytes 0–3 | 0000, any | Single, Multiple |
| 0111_1000_0000_0000 | Bytes 1–4 | 0001 | Single |
| 0011_1100_0000_0000 | Bytes 2–5 | 0010 | Single |
| 0001_1110_0000_0000 | Bytes 3–6 | 0011 | Single |
| 0000_1111_0000_0000 | Bytes 4–7 | 0100 | Single |
| 0000_0111_1000_0000 | Bytes 5–8 | 0101 | Single |
| 0000_0011_1100_0000 | Bytes 6–9 | 0110 | Single |
| 0000_0001_1110_0000 | Bytes 7–10 | 0111 | Single |
| 0000_0000_1111_0000 | Bytes 8–11 | 1000 | Single |
| 0000_0000_0111_1000 | Bytes 9–12 | 1001 | Single |
| 0000_0000_0011_1100 | Bytes 10–13 | 1010 | Single |
| 0000_0000_0001_1110 | Bytes 11–14 | 1011 | Single |
| 0000_0000_0000_1111 | Bytes 12–15 | 1100 | Single |
| 1111_1000_0000_0000 | Bytes 0–4 | 0000, any | Single, Multiple |
| 0111_1100_0000_0000 | Bytes 1–5 | 0001 | Single |
| 0011_1110_0000_0000 | Bytes 2–6 | 0010 | Single |
| 0001_1111_0000_0000 | Bytes 3–7 | 0011 | Single |
| 0000_1111_1000_0000 | Bytes 4–8 | 0100 | Single |
| 0000_0111_1100_0000 | Bytes 5–9 | 0101 | Single |
| 0000_0011_1110_0000 | Bytes 6–10 | 0110 | Single |
| 0000_0001_1111_0000 | Bytes 7–11 | 0111 | Single |
| 0000_0000_1111_1000 | Bytes 8–12 | 1000 | Single |
| 0000_0000_0111_1100 | Bytes 9–13 | 1001 | Single |
| 0000_0000_0011_1110 | Bytes 10–14 | 1010 | Single |
| 0000_0000_0001_1111 | Bytes 11–15 | 1011 | Single |
| 1111_1100_0000_0000 | Bytes 0–5 | 0000, any | Single, Multiple |
| 0111_1110_0000_0000 | Bytes 1–6 | 0001 | Single |
| 0011_1111_0000_0000 | Bytes 2–7 | 0010 | Single |
| 0001_1111_1000_0000 | Bytes 3–8 | 0011 | Single |

-continued

| Byte Enable Signal | Bytes Used | Address Signal (4 Least Sig. Bits) | Beat Transfer Types for which Signal can be Asserted |
|---|---|---|---|
| 0000_1111_1100_0000 | Bytes 4–9 | 0100 | Single |
| 0000_0111_1110_0000 | Bytes 5–10 | 0101 | Single |
| 0000_0011_1111_0000 | Bytes 6–11 | 0110 | Single |
| 0000_0001_1111_1000 | Bytes 7–12 | 0111 | Single |
| 0000_0000_1111_1100 | Bytes 8–13 | 1000 | Single |
| 0000_0000_0111_1110 | Bytes 9–14 | 1001 | Single |
| 0000_0000_0011_1111 | Bytes 10–15 | 1010 | Single |
| 1111_1110_0000_0000 | Bytes 0–6 | 0000, any | Single, Multiple |
| 0111_1111_0000_0000 | Bytes 1–7 | 0001 | Single |
| 0011_1111_1000_0000 | Bytes 2–8 | 0010 | Single |
| 0001_1111_1100_0000 | Bytes 3–9 | 0011 | Single |
| 0000_1111_1110_0000 | Bytes 4–10 | 0100 | Single |
| 0000_0111_1111_0000 | Bytes 5–11 | 0101 | Single |
| 0000_0011_1111_1000 | Bytes 6–12 | 0110 | Single |
| 0000_0001_1111_1100 | Bytes 7–13 | 0111 | Single |
| 0000_0000_1111_1110 | Bytes 8–14 | 1000 | Single |
| 0000_0000_0111_1111 | Bytes 9–15 | 1001 | Single |
| 1111_1111_0000_0000 | Bytes 0–8 | 0000, any | Single, Multiple |
| 0111_1111_1000_0000 | Bytes 1–8 | 0001 | Single |
| 0011_1111_1100_0000 | Bytes 2–9 | 0010 | Single |
| 0001_1111_1110_0000 | Bytes 3–10 | 0011 | Single |
| 0000_1111_1111_0000 | Bytes 4–11 | 0100 | Single |
| 0000_0111_1111_1000 | Bytes 5–12 | 0101 | Single |
| 0000_0011_1111_1100 | Bytes 6–13 | 0110 | Single |
| 0000_0001_1111_1110 | Bytes 7–14 | 0111 | Single |
| 0000_0000_1111_1111 | Bytes 7–15 | 1000 | Single |
| 1111_1111_1000_0000 | Bytes 0–8 | 0000, any | Single, Multiple |
| 0111_1111_1100_0000 | Bytes 1–9 | 0001 | Single |
| 0011_1111_1110_0000 | Bytes 2–10 | 0010 | Single |
| 0001_1111_1111_0000 | Bytes 3–11 | 0011 | Single |
| 0000_1111_1111_1000 | Bytes 4–12 | 0100 | Single |
| 0000_0111_1111_1100 | Bytes 5–13 | 0101 | Single |
| 0000_0011_1111_1110 | Bytes 6–14 | 0110 | Single |
| 0000_0001_1111_1111 | Bytes 7–15 | 0111 | Single |
| 1111_1111_1100_0000 | Bytes 0–9 | 0000, any | Single, Multiple |
| 0111_1111_1110_0000 | Bytes 1–10 | 0001 | Single |
| 0011_1111_1111_0000 | Bytes 2–11 | 0010 | Single |
| 0001_1111_1111_1000 | Bytes 3–12 | 0011 | Single |
| 0000_1111_1111_1100 | Bytes 4–13 | 0100 | Single |
| 0000_0111_1111_1110 | Bytes 5–14 | 0101 | Single |
| 0000_0011_1111_1111 | Bytes 6–15 | 0110 | Single |
| 1111_1111_1110_0000 | Bytes 0–10 | 0000, any | Single, Multiple |
| 0111_1111_1111_0000 | Bytes 1–11 | 0001 | Single |
| 0011_1111_1111_1000 | Bytes 2–12 | 0010 | Single |
| 0001_1111_1111_1100 | Bytes 3–13 | 0011 | Single |
| 0000_1111_1111_1110 | Bytes 4–14 | 0100 | Single |
| 0000_0111_1111_1111 | Bytes 5–15 | 0101 | Single |
| 1111_1111_1111_0000 | Bytes 0–11 | 0000, any | Single, Multiple |
| 0111_1111_1111_1000 | Bytes 1–12 | 0001 | Single |
| 0011_1111_1111_1100 | Bytes 2–13 | 0010 | Single |
| 0001_1111_1111_1110 | Bytes 3–14 | 0011 | Single |
| 0000_1111_1111_1111 | Bytes 4–15 | 0100 | Single |
| 1111_1111_1111_1000 | Bytes 0–12 | 0000, any | Single, Multiple |
| 0111_1111_1111_1100 | Bytes 1–13 | 0001 | Single |
| 0011_1111_1111_1110 | Bytes 2–14 | 0010 | Single |
| 0001_1111_1111_1111 | Bytes 3–15 | 0011 | Single |
| 1111_1111_1111_1100 | Bytes 0–13 | 0000, any | Single, Multiple |
| 0111_1111_1111_1110 | Bytes 1–14 | 0001 | Single |
| 0011_1111_1111_1111 | Bytes 2–15 | 0010 | Single |
| 1111_1111_1111_1110 | Bytes 0–14 | 0000, any | Single, Multiple |
| 0111_1111_1111_1111 | Bytes 1–15 | 0001 | Single |
| 1111_1111_1111_1111 | Bytes 0–15 | 0000, any | Single, Multiple |

From the transfer qualifier signals, a slave 20 can determine exactly what the starting byte address alignment is from the starting address; the total number of data beats including full and partial bus width transfers from the transfer request size; and, finally, the ending address alignment from the byte enables. Accordingly, a multiple beat data transfer does not need to be treated as multiple transfer requests, each with their complete set of signals.

IV. Illustrative Operation

Although the invention is described relative to a multiple beat, unaligned data transfer, it should be recognized that it is also applicable to: single beat, unaligned; single beat, aligned and multiple beat, aligned data transfers. For a data transfer capable of completion during a single beat, the transfer size signal will equal 0001. In this case, the byte enable signal will represent the byte enable(s) for the single beat. In this manner, a single beat data transfer of less than the full bus width may easily be denoted. For example, a single beat data transfer with byte enable signal 0000_0000_0110_0000 will transfer only two bytes. In this case, the lower order address bus signal will indicate 1001, which is the starting byte address of the transfer.

Figure 3:
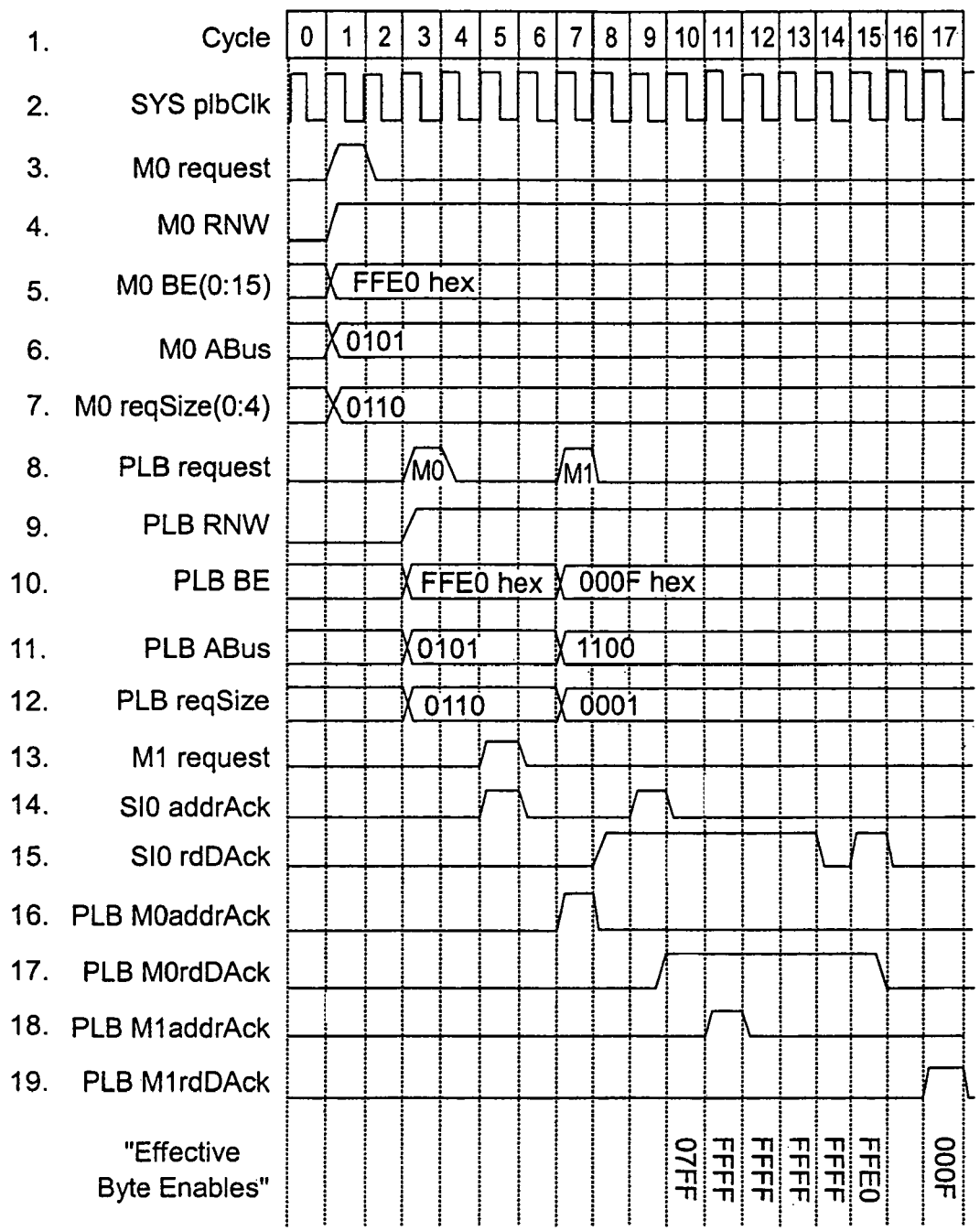
FIG. 3 shows a timing diagram for the unaligned multiple beat data transfer of FIG. 2.

Referring to FIGS. 2–3, a data transfer-bus alignment diagram and timing diagram for an illustrative multiple beat, unaligned data transfer are respectively shown. In this example, the data transfer is a read data transfer from a memory slave. The illustrative data transfer has a request transfer size signal of 6, i.e., the total number of full and partial data beats is 6. In addition, the data transfer has a starting address 0101 (i.e., byte 5) and byte enable signal of 1111_1111_1110_0000 (i.e., the byte enable(s) 0:10 for the last data beat). This information indicates a data transfer of 86 bytes. As shown in FIG. 2, multiple beat transfers of full bus width (data beats 2–5) with a partial starting bus width (data beat 1) and a partial ending bus width (data beat 6) may easily be denoted.

FIG. 3 shows illustrative signal transfers. Row 1 of FIG. 3 shows the sequential clock cycle numbers in correspondence with the SYS plbClk signal of Row 2. Row 3 shows the one clock cycle assertion of a request (M0 Request) from a master M0. The request is asserted for one clock cycle only for each separate bus request. Row 4 shows the assertion of the master's read/not write signal (M0 RNW). In this case, the signal is 1, indicating the request is for a read data operation by the master; otherwise, it would be 0 for a write.

Rows 5, 6 and 7 show, respectively, the assertion of the byte enable signal (M0_BE) 1111_1111_1110_0000 (FFE0 in hex,) indicating bytes 0:10 will be required during the last data beat; the lower order address bus signal (M0 ABus) with a value of 0101 (byte 5); and the request transfer size signal (M0 reqSize) from the master to the bus with a value of 0110 (6). The data beats shown in FIG. 2 correspond to this data, i.e., the starting byte address is five for data beat 1, and data beat 6 requires bytes 0:10.

Returning to FIG. 3, Row 8 shows the bus request (PLB request) being asserted to the slave for one clock cycle (cycle 3). Row 8 also shows a second assertion (cycle 7) of the request that illustrates address pipelining initiated by another master's M1 request. In this fashion, the invention allows reuse of transfer qualifier signals prior to completion of preceding data transfers. The bus request (PLB request) indicates that a valid address and transfer qualifiers are on arbiter macro 24 (FIG. 1) outputs, and a selected slave 20 (FIG. 1) should decode this information to begin a transfer. Row 9 shows the bus read/not write signal (PLB RNW) being asserted. Again, the signal is 1, indicating the request is for a read of data from the slave; otherwise, it would be 0 for a write. Rows 10, 11 and 12 show, respectively, the actual assertion of the byte enable signal (PLB BE), the address bus signal (PLB ABus), and the request transfer size signal (PLB reqSize) to the slave from arbiter macro 24 (FIG. 1).

Row 13 shows a second data transfer request (M1 request) from another, second master M1 to the bus illustrating the ability to pipeline data transfers. Other signals that may accompany the second data transfer request, such as the transfer qualifier signals, have been omitted for brevity.

Row 14 shows an address acknowledge (SL0 addrAck) from the slave to arbiter macro 24 (FIG. 1) of bus 18. Row 15 shows a read data acknowledge (SL0 rdDAck) from slave 20 (FIG. 1) to bus 18 including its assertion for the six data beats for data transfer. Row 16 shows an address acknowledge (PLB M0addrAck) from arbiter macro 24 (FIG. 1) to master M0. Row 17 shows a read data acknowledge (PLB M0rdDAck) from arbiter macro 24 (FIG. 1) to master M0 including its assertion for the data for six data beats. Row 18 shows an address acknowledge (PLB M1addrAck) from arbiter macro 24 (FIG. 1) to master M1. Finally, Row 19 shows a read data acknowledge (PLB M1rdDAck) from arbiter macro 24 (FIG. 1) to master 12 including the data in one data beat. The row entitled "Effective Byte Enables" illustrates the bus byte enabled content (in hex equivalents) corresponding to each data beat. For the first data transfer, this corresponds to the content shown in FIG. 2. As shown in FIGS. 2 and 3, during a first data beat, 11 bytes are transferred starting at byte address 0101 (5); for the second through the fifth data beat, 64 bytes are transferred (4×16 bytes); and for the sixth data beat 11 bytes are also transferred.

While the invention has been described relative to the above signals, it should be recognized that a variety of other signals (not shown) may also be communicated between master 12, bus 18 (arbiter macro 24) and slave 20.

V. CONCLUSION

In the previous discussion, it will be understood that the method steps discussed are performed by hardware contained within computer system 10. However, it is understood that the various devices, modules, mechanisms and systems described herein may be realized in hardware or software, or a combination of hardware and software, and may be compartmentalized other than as shown. They may be implemented by any type of processing system or other apparatus adapted for carrying out the methods described herein. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A signal generator comprising:
   a master functional unit to initiate a data transfer request;
   a bus including a bus width of a plurality of bytes; and
   a data transfer unit coupled to the master functional unit, the data transfer unit configured to generate:
   a data transfer request signal;
   a first signal including a starting byte address of the data transfer;
   a second signal including a size of the data transfer in data beats; and
   a third signal including a byte enable for each byte required during a last data beat of the data transfer.

2. The signal generator of claim 1, wherein the data transfer is contiguous from start to finish.

3. The signal generator of claim 1, wherein the bus includes an arbiter configured to direct the data transfer including the first, second and third signals from a selected master to a slave.

4. The signal generator of claim 3, wherein the arbiter is also configured to direct another data transfer based on another data transfer request from one of the master and another master to a slave prior to completing the data transfer.

* * * * *